US012722159B2

(12) United States Patent
Back et al.

(10) Patent No.: US 12,722,159 B2
(45) Date of Patent: Sep. 1, 2026

(54) CUTTING SET SYSTEM FOR A MEAT MINCING MACHINE

(71) Applicant: Lumbeck & Wolter GmbH & Co. KG, Wuppertal (DE)

(72) Inventors: Udo Back, Münnerstadt/Reichenbach (DE); Fabian Döring, Wuppertal (DE)

(73) Assignee: Lumbeck & Wolter GmbH & Co. KG, Wuppertal (DE)

( * ) Notice: Subject to any disclaimer, the term of this patent is extended or adjusted under 35 U.S.C. 154(b) by 279 days.

(21) Appl. No.: 18/412,864

(22) Filed: Jan. 15, 2024

(65) Prior Publication Data

US 2024/0149273 A1 May 9, 2024

Related U.S. Application Data

(63) Continuation of application No. 17/907,559, filed as application No. PCT/EP2021/058913 on Apr. 6, 2021, now abandoned.

(51) Int. Cl.
*B02C 18/30* (2006.01)
*B02C 18/36* (2006.01)

(52) U.S. Cl.
CPC ............ *B02C 18/362* (2013.01); *B02C 18/30* (2013.01); *B02C 18/301* (2013.01); *B02C 18/36* (2013.01)

(58) Field of Classification Search
CPC ... A22C 17/0026; B02C 18/362; B02C 18/30; B02C 18/301; B02C 18/36
See application file for complete search history.

(56) References Cited

U.S. PATENT DOCUMENTS

| | | | | |
|---|---|---|---|---|
| 1,015,403 | A | 1/1912 | Achaarschmidt | |
| 1,891,712 | A | 12/1932 | Jahn | |
| 1,906,609 | A | 5/1933 | Jahn | |
| 4,202,502 | A * | 5/1980 | Laska | B02C 18/36 241/82.5 |
| 4,981,270 | A | 1/1991 | Reber | |
| 9,162,230 | B2 * | 10/2015 | Wight | B02C 18/365 |

(Continued)

FOREIGN PATENT DOCUMENTS

| | | |
|---|---|---|
| CN | 204448211 U | 7/2015 |
| DE | 809769 C | 8/1951 |

(Continued)

OTHER PUBLICATIONS

International Preliminary Report on Patentability under Chapter II in patent application No. PCT/EP2021/058913, dated Nov. 4, 2021.

(Continued)

*Primary Examiner* — Matthew Katcoff
(74) *Attorney, Agent, or Firm* — Oppedahl Patent Law Firm LLC

(57) ABSTRACT

The invention relates to a reliable cutting set system for a meat mincing machine. The mutually matched coding (14, 24) between knife pins (10) and the cutting set element (20) prevents an incorrect installation of the cutting set element (20) after a cleaning process or during the initial assembly, thereby increasing the operational safety. The invention allows a detection of the correct cutting set element (20) of a cutting set system and thus an unambiguous allocation of the cutting set element to a knife pin (10) of a cutting set system.

9 Claims, 5 Drawing Sheets

(56) References Cited

U.S. PATENT DOCUMENTS

| | | | | |
|---|---|---|---|---|
| 11,077,447 | B2 | 8/2021 | Back | |
| 12,030,059 | B2 * | 7/2024 | Lind | B02C 18/2216 |
| 2002/0084368 | A1 | 7/2002 | Bernhardt | |
| 2007/0001040 | A1 | 1/2007 | Walters | |
| 2009/0126582 | A1 | 5/2009 | Knecht | |
| 2010/0282887 | A1 * | 11/2010 | Walters | B26D 1/29 241/278.1 |
| 2015/0108259 | A1 | 4/2015 | Metcalf | |
| 2019/0076850 | A1 | 3/2019 | Looft | |

FOREIGN PATENT DOCUMENTS

| | | | |
|---|---|---|---|
| DE | 827454 | C | 1/1952 |
| DE | 4301787 | C1 | 8/1994 |
| DE | 102008019812 | A1 | 10/2009 |
| DE | 102011008389 | A1 | 7/2012 |
| DE | 202013006419 | U1 | 8/2013 |
| DE | 202014104033 | U1 | 9/2014 |
| DE | 102013220137 | B3 | 3/2015 |
| DE | 202014103049 | U1 | 3/2015 |
| DE | 102015109981 | A1 | 1/2016 |
| DE | 102015114891 | A1 | 3/2017 |
| DE | 202016103109 | U1 | 8/2017 |
| DE | 102017109978 | A1 | 11/2018 |
| DE | 202020103763 | U1 | 7/2020 |
| DE | 202020105051 | U1 | 9/2020 |
| DE | 202020105052 | U1 | 9/2020 |
| DE | 202020106351 | U1 | 11/2020 |
| DE | 202021101566 | U1 | 4/2021 |
| DE | 202022102585 | U1 | 5/2022 |
| EP | 2845649 | A1 | 3/2015 |
| EP | 3964295 | A1 | 3/2022 |
| GB | 1134910 | | 11/1968 |
| WO | WO2017036773 | A1 | 3/2017 |
| WO | WO2021223950 | A1 | 11/2021 |
| WO | WO2022002450 | A1 | 1/2022 |
| WO | WO2022049111 | A1 | 3/2022 |
| WO | WO2022096556 | A1 | 5/2022 |

OTHER PUBLICATIONS

International Search Report in patent application No. PCT/EP2021/058913, dated Jun. 22, 2021.

* cited by examiner

CUTTING SET SYSTEM FOR A MEAT MINCING MACHINE

The invention relates to a cutting set system for a meat grinder. U.S. patent application Ser. No. 17/907,559, filed Apr. 6, 2021, and international patent application number PCT/EP2021/058913, filed Apr. 6, 2021, and German patent application number 20 2020 102 505.8, filed May 5, 2020, are all hereby incorporated by reference for all purposes.

BACKGROUND

Meat grinders are used for the grinding of pieces of meat and for this purpose they have cutting elements, such as, for example, perforated discs and knives. During the grinding process, the knife is driven and the perforated disc is held stationary in a housing. After several cutting operations, the cutting parts are removed from the housing and, if necessary, reground for sharpening before they are re-inserted into the housing. Frequent assembly and disassembly operations are also necessary for maintaining hygiene. In this case, the correct assignment of all cutting elements to a cutting set system and the correct installation thereof is important for a good grinding result.

Most meat grinders work with a perforated disc and a knife. In this case, the knife edge faces the perforated disc. Incorrect insertion of the knife after a cleaning operation is rather unlikely. Less commonly, a meat grinder may have a plurality of cutting sets or cutting elements are used, such as, for example, precutters, slices and knives. In this case, the knives as a rule have cutters or slicers on both sides in order to be able to interact with adjacent perforated discs. Such a knife is shown in document DE 43 01 787 C1. When such a knife is installed, care must be taken to ensure that the cutting edges point in the direction of rotation. If such a knife is incorrectly installed, the cutting edges of the knife do not point in the direction of rotation. Although such a knife can cut, it is very likely to be destroyed by overloading. Meat grinders are also known in which the perforated disc is driven and the knife remains stationary in a housing. Here, too, care must be taken that the perforated discs are installed in the correct orientation, in particular if their perforations are conical rather than cylindrical.

In order to prevent incorrect installation, it is known from DE 809 769 to provide a cross-section for the hole of the knife and the collar of the blade journal, which has the shape of an uneven, asymmetrical polygon. This is acceptable in the system described therein, in which only one knife is seated on the blade journal of the screw conveyor. However, this solution is disadvantageous for a knife journal of a meat grinder in which a plurality of cutting elements are employed for the grinding of meat. In particular, in the type of meat grinder in which the cutting elements are fixed and the perforated disc rotate, the cutting elements would each be required to have to have a large central opening for the blade journal, which is undesirable.

The object of the present invention is to propose a simple, reliable cutting set system which, on the one hand, prevents a faulty installation of each cutting element, such as such as a knife or a perforated disc, of the cutting set system, and, on the other hand, also allows the cutting elements to be assigned to particular cutting set systems.

SUMMARY OF THE INVENTION

This object is achieved with a cutting set system having the features of claim 1. Advantageous embodiments are described in the dependent claims.

The new cutting set system for a meat grinder comprises a drivable blade journal and at least one cutting element, for example a knife and/or a perforated disc, which is mounted in a rotationally fixed manner on the blade journal. The cross section of the through bore of this cutting element is adapted to the cross section of the blade journal. The blade journal can have different cross-sections, for example a square, a hexagon or other polygonal cross-sections, so that the knife or other cutting element can be driven by rotation of the blade journal. In this case, the blade journal has a cross-section in which the circumferential surface has two parallel surfaces, and it has further partial circumferential surfaces that connect these parallel circumferential surfaces.

For such a blade journal, the cutting element has a through-bore with an inner surface, which has corresponding partial inner surfaces, so that, during a rotational movement of the blade journal, the mounted cutting element is carried along by the blade journal. The partial circumferential surfaces of the blade journal act as drive surfaces on the abutting partial inner surfaces of the cutting element and thus transmit the torque to the cutting element.

In a manner according to the invention, the new cutting set system has at least one coding which matches a particular cutting element to a particular blade journal. This coding is a coding element on the cutting element and a journal-side coding element, which are matched to one another.

In one possible embodiment, a journal-side coding element, which is shaped as desired in cross section, interacts with a coding element on the cutting element, which coding element has a corresponding shape in cross section. In the case of the coding element on the cutting element, the coding element is provided on the inner surface of the through-bore penetrating the central hub; as for the journal-side coding element, it is present on the circumferential surface of the journal. In this case, the coding element is provided on a partial circumferential surface or between two partial circumferential surfaces. Advantageously, only a slight deviation from a cross section of the blade journal without coding is necessary for such a journal-side coding element.

In a known manner, the blade journal for the meat grinder has a front connecting section to a screw conveyor. This connecting section comprises, for example, a thread for a screw connection to the screw conveyor. In a further embodiment, the connection between the blade journal and the screw conveyor consists of some other known form-fitting and/or force-fitting connection, for example a plug-in connection. The rear section of the blade journal (rearward in the direction of flow) represents the bearing section for the cutting elements, such as, for example, knives and/or perforated disks. For cutting elements that are rotationally fixed, they have a through-bore in their central hub. In the case of a knife as a cutting element, a plurality of knife blades with cutting edges on both sides are arranged around this hub and interact with perforated discs arranged adjacent to one another in the meat grinder. In the case of a driven perforated disk as a cutting element, a plurality of holes are arranged around this hub, which holes interact, for example, with adjacent perforated disks arranged in a stationary manner in the meat grinder. If a cutting element of the new cutting set system is mounted on the blade journal for the first time or again, for example after cleaning or regrinding, this is only possible in the intended orientation due to the coding. The novel coordinated coding of the blade journal and the cutting element enables simple assembly and disassembly with high operating reliability.

In an advantageous embodiment, a journal-side coding element is provided between adjacent partial circumferential surfaces of the blade journal and a coding element is likewise provided on the cutting element between two adjacent partial inner surfaces. If the mutually matched coding elements are shaped elements, such as, for example, convex or concave formations on the circumferential surfaces, the journal-side coding element and the coding element on the cutting element are or lie against one another in the assembled state. Such a coding on the blade journal can also be produced in a simple manner by removal of material at the contact edge between the two aforementioned partial circumferential surfaces on a known knife journal, so that, for example, a new surface oriented in the axial direction of the blade journal is produced in the region of the earlier contact edge of the two adjacent partial circumferential surfaces. Such a connecting surface serving as a journal-side coding element between two adjacent partial circumferential surfaces of the blade journal or in the same way also in the case of a connecting surface, which serves as a coding element on the cutting element, between two corresponding partial inner surfaces of the cutting element can be a flat or curved or otherwise running connecting surface, in the simplest way around a flat connecting surface. In any case, the cutting element receives a coding element adapted to the coding element of the blade journal, so that, in the installed state, the cutting element is mounted suitably on the blade journal and good torque transmission is ensured. Such a coding element on the blade journal can not only be produced easily retrospectively. It has also the advantage that earlier knives lacking the coding can be placed on such a blade journal and can be used further in such a cutting set system, which reduces costs for the user.

If the journal-side coding element is already formed during the production of the blade journal, according to a further embodiment, the journal-side coding element is also designed as a rib which runs in the axial direction of the blade journal and interacts with a coding element on the cutting element, which coding element is designed as a groove. Such a rib can also be arranged in the region of the contact line of two adjacent partial circumferential surfaces of the blade journal.

In a further embodiment of the new coding, the journal-side coding element, such as, for example, a groove or rib extending in the axial direction of the blade journal, is arranged on a partial circumferential surface and a rib or groove is provided as coding element on the cutting element in a suitable manner for this purpose.

So that only high-quality knives or perforated disks are used in a meat grinder, an identification can be provided for the cutting set system, namely an automatic and contactless transmitter/receiver system. Such a transmitter/receiver system can also be configured as coordinated coding between the blade journal and the cutting element. This means that, on the one hand, the correct installation can be established. On the other hand, such a system can additionally or also only serve for identification. For this purpose, in one embodiment, such a cutting element is equipped with a transponder, which is preferably arranged on the inner surface of the through bore of the cutting element, for example an RFID chip. This transponder interacts with a receiver on the meat grinder. When using an RFID chip which has a short range, the receiver is preferably provided in the blade journal. Such a receiver can be connected to the meat grinder via lines which are guided through an axial bore of the blade journal. In this way, after a knife has been inserted, it can be quickly determined whether it is a desired high-quality cutting element.

It is possible to provide one or more encodings for a cutting set system. Preferably, only one coding element is present on the blade journal.

The coordinated coding between the blade journal and the cutting element prevents a faulty installation of the cutting insert element after a cleaning process or during initial assembly, and thus increases the operating safety. It allows recognition of the correct cutting element of a cutting set system and thus a clear assignment of the cutting elements to a blade journal of a cutting set system.

The invention is described below with reference to two exemplary embodiments with reference to the drawing, in which in both exemplary embodiments, the cutting element is a knife. It will however be appreciated that the codings shown can also be employed in the case where the drivable cutting element is a perforated disk rather than a knife.

DETAILED DESCRIPTION

Figure 1:
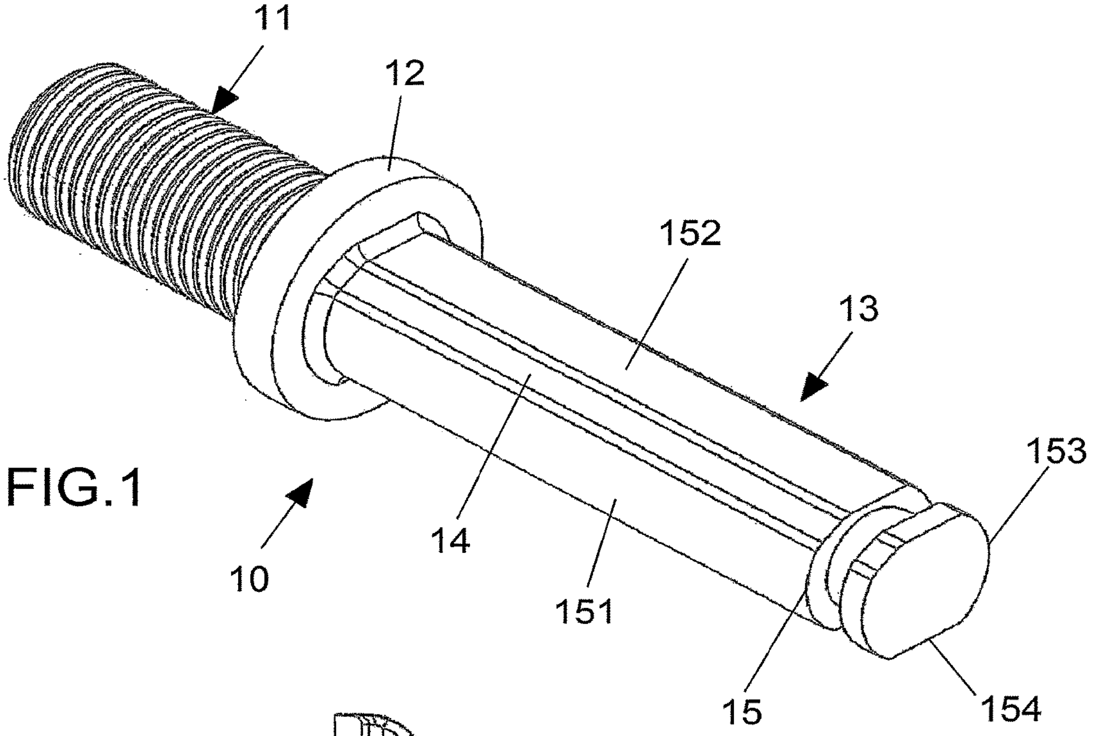
FIG. 1: perspective view of a blade journal.
Figure 2:
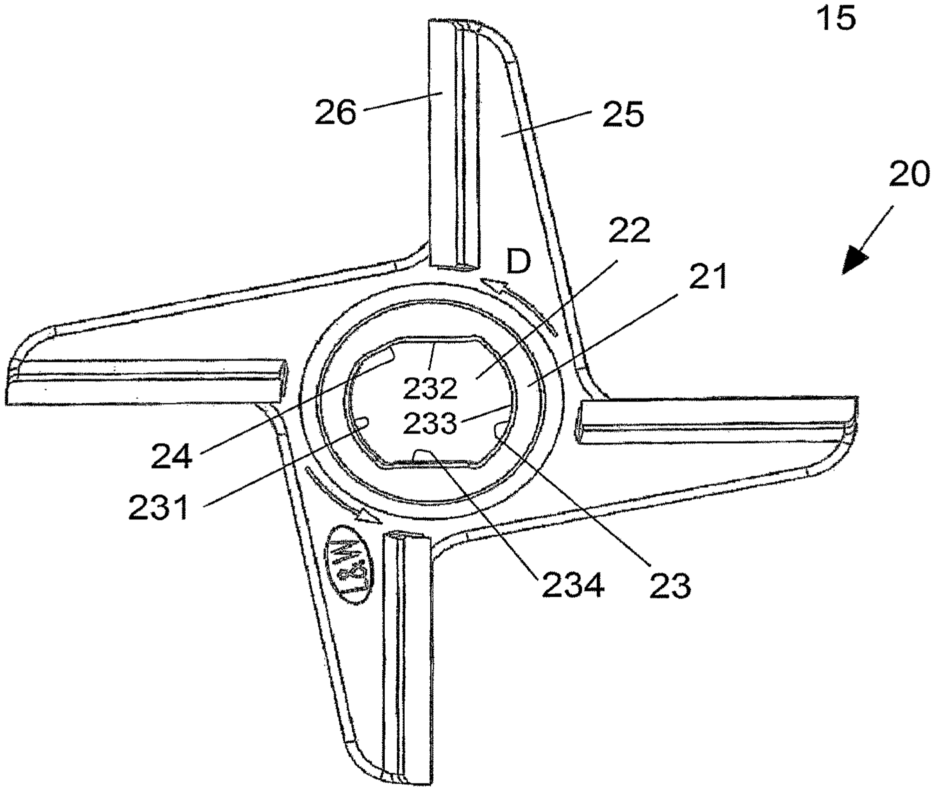
FIG. 2 is a front view of a knife.
Figure 3:
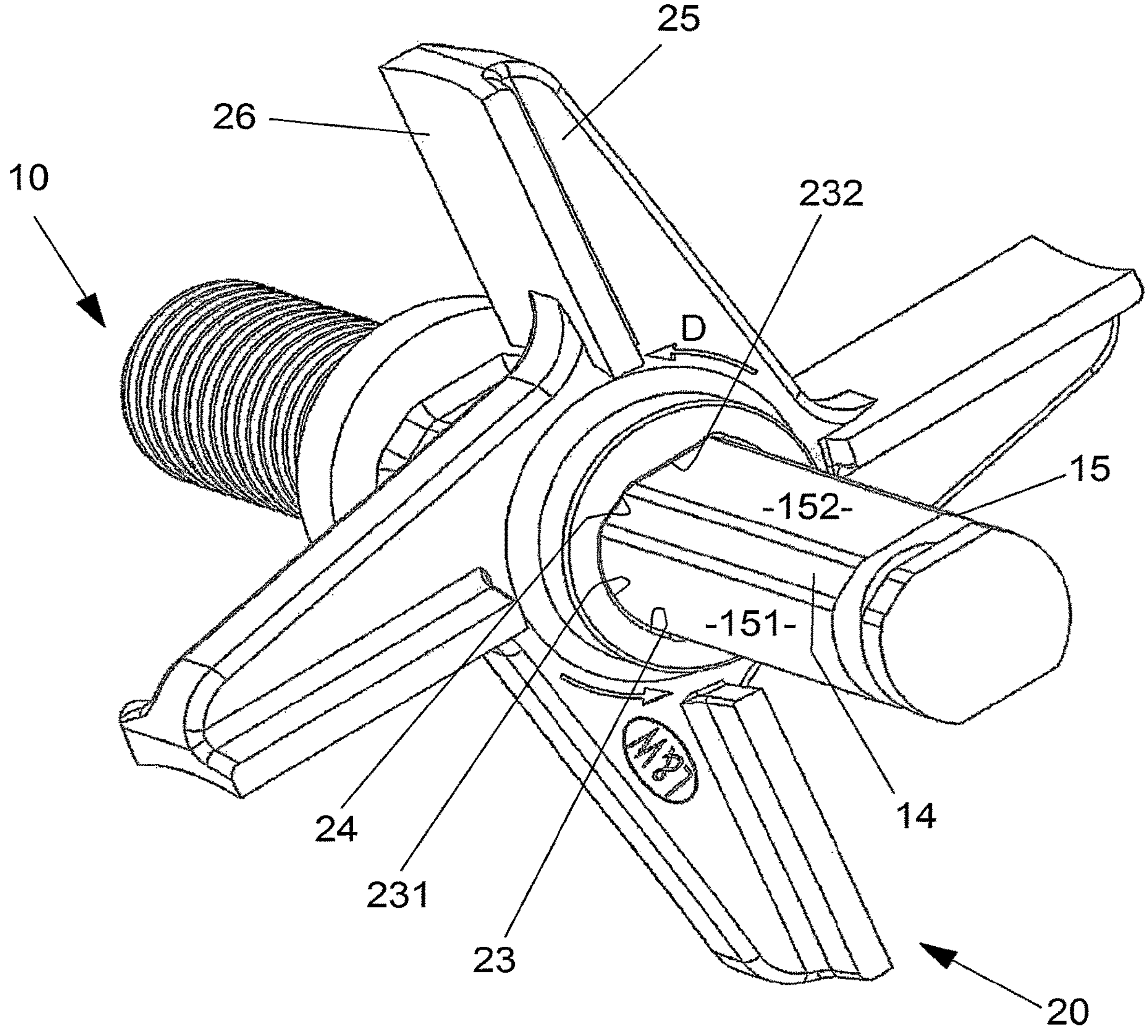
FIG. 3: a cutting set system comprising a blade journal according to FIG. 1 and knife according to FIG. 2, FIG. 4: perspective view of a further knife journal.

FIGS. 1 to 3 show a first embodiment of the invention. FIG. 1 shows the blade journal 10 and in FIG. 2 the knife 20, with the new cutting set system shown in FIG. 3. Such a cutting set system is used in a meat grinder. Via its connecting section 11, in this case a screw-in thread, the blade journal 10 is screwed axially into a screw conveyor (not shown here) and moved together therewith. During this rotary movement D, the knife 20 is mounted in a rotationally fixed manner on the blade journal 10, in the bearing section 13. In the meat grinder, the knife 20 cooperates with a perforated disk (omitted for clarity in FIG. 3) which is used as a further cutting part in the meat grinder. Typically, there is a precutter in the meat grinder behind the contact surface 12 and at least one combination consisting of knives 20 and perforated disc. These are pushed onto the blade journal 10 in the bearing section. In order that the blade journal 10 can take along the knife 20 during the rotary movement D, the blade journal 10 has a corresponding polygonal cross-section. This can be a square, hexagon or other polygonal cross-section. FIG. 1 shows a blade journal 10 with a circumferential surface 15 with two parallel partial circumferential surfaces 152, 154. In between, the partial circumferential surfaces 151, 153, wherein the latter show a curved course, are shown. Contact edges are located between two adjacent partial circumferential surfaces. Only between the partial circumferential surface 151 and 152 is the contact edge and an inclined connecting surface, which serves as the coding element 14. This coding element 14 corresponds to a coding element 24 on the inner surface 23 of the knife 20. This knife 20 has a through bore 22 in the central hub 21 with an inner surface 23 adapted to the circumferential surface 15 of the blade journal 10, so that the four partial inner surfaces 231, 232, 233 and 234 lie against the corresponding partial circumferential surfaces 151, 152, 153, 154 of the blade journal 10; see FIG. 3. In the installed state of the knife 20, the coding element 14 of the blade journal 10 is located adjacent to the coding element 24 of the knife 20. Good torque transmission from the blade journal 10 to the knife 20 is thus ensured. Due to this coding with the coding elements 14, 24, the knife 20 can only be pushed onto the blade journal 10 in this orientation. A backwards arrangement, that is, a pushing-on of the knife onto the blade journal with the (incorrect) front side shown in FIG. 2 rather than the (correct) back side, is prevented, so that it is ensured that the knife 20 is correctly arranged on the blade journal 10. In this correctly installed state, the cutting edges 26 on the knife blades 25 of the knife 20 point in the direction of rotation D and, as intended, are able to carry out the cutting operation.

Figure 4:
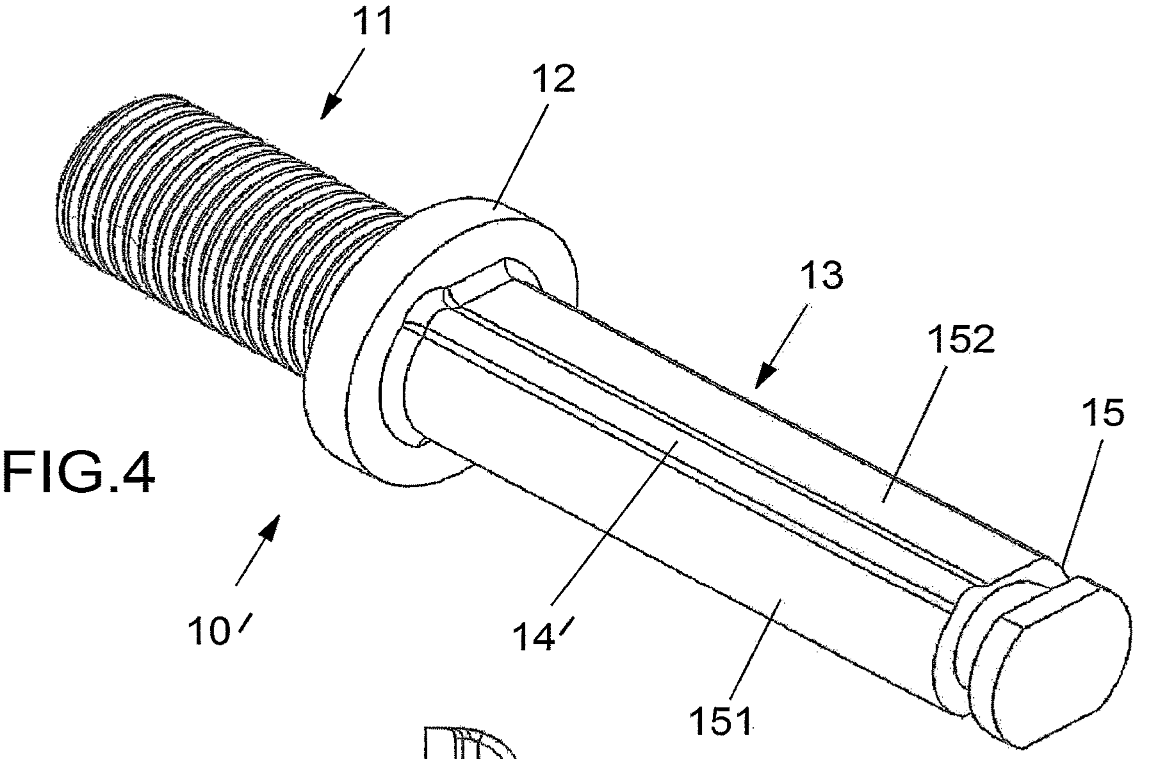
Figure 5:
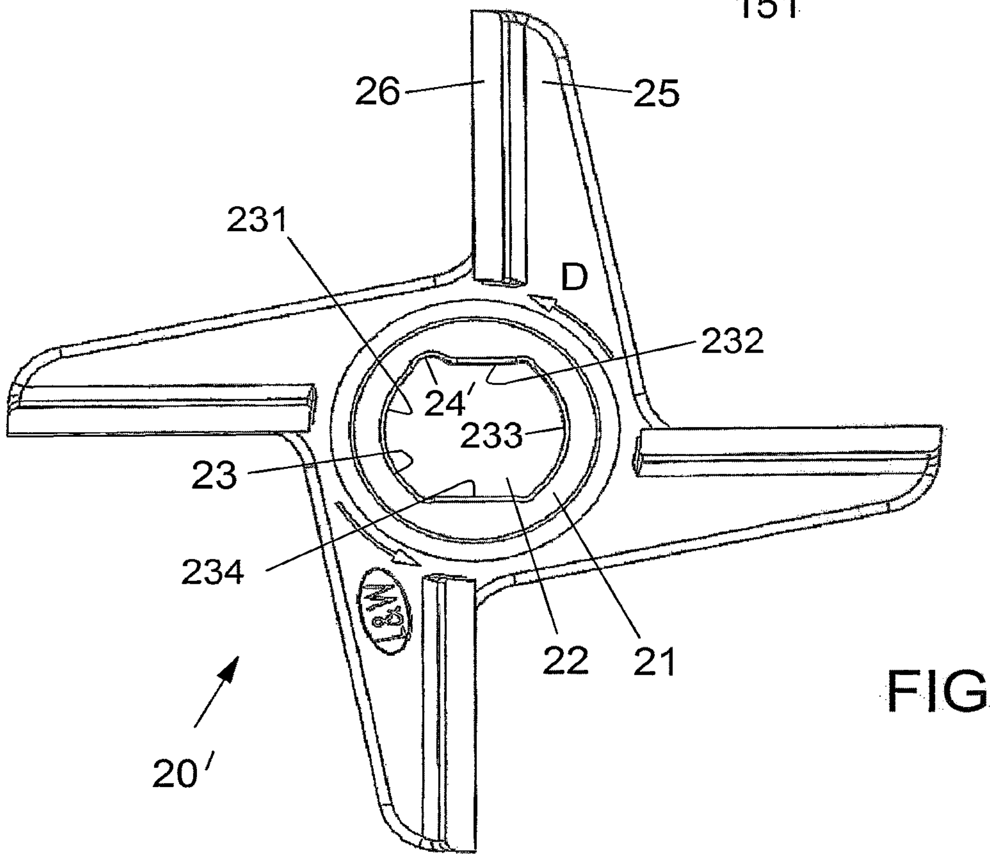
FIG. 5: front view of a further knife.
Figure 6:
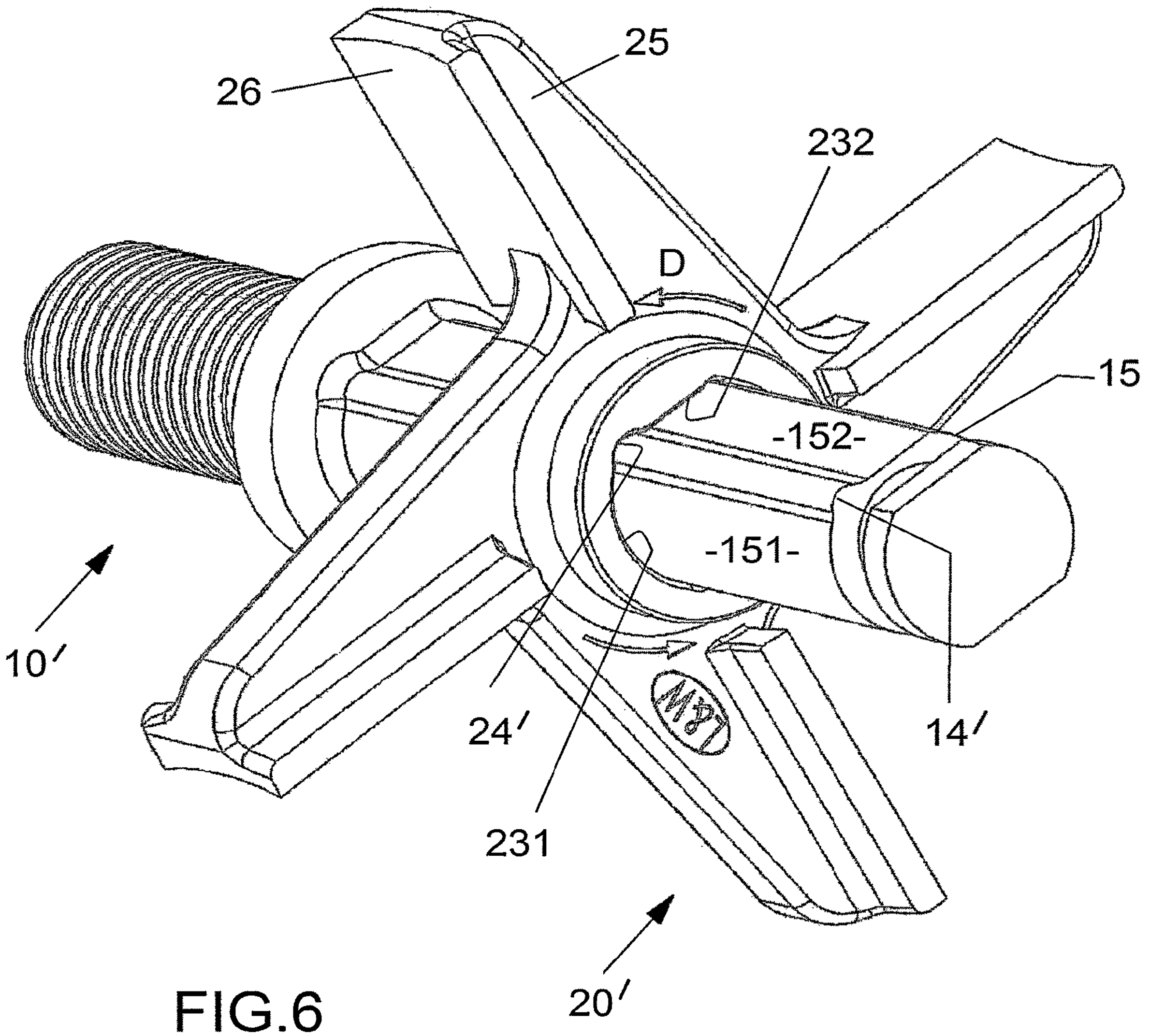
FIG. 6: a cutting set system comprising a blade journal according to FIG. 4 and knife according to FIG. 5.

A further embodiment of the new cutting set system is shown in FIG. 6. This cutting set system for a meat grinder also comprises a blade journal 10' and a knife 20', which are provided with a coordinated coding. Thus, the blade journal 10' has a circumferential surface 15 in the bearing section 13, which is provided for the rotationally fixed mounting of the knife 20', where between two partial circumferential surfaces 151 a rib 14' extending in the longitudinal direction of the blade journal 10' is provided, which interacts with a knife-side coding element in the form of a groove 24' on the inner surface 23 of the knife 20'. The rib 14' has an approximately triangular cross section. The approximately triangular cross section is rounded off at the corners, so as to reduce the risk of injury. In this case, too, it is ensured that the knife 20' can only be pushed onto the blade journal 10', and mounted in place, in a particular orientation. After the knife 20' has been mounted, the partial inner surfaces 231, 232, 233, 234 and the coding element 20' fit snugly against the circumferential surface 15 of the blade journal 10; see FIG. 6. The cutting edges 26 on the knife blades 25 of the knife 20' are aligned in each case in the direction of rotation D and a good cutting operation is ensured. When using the method shown in FIG. 4, with the rib 14' as a coding element which projects beyond the partial circumferential surface 151, 152, the only knife journals 20' that can be mounted are those with a corresponding groove.

Figure 7:
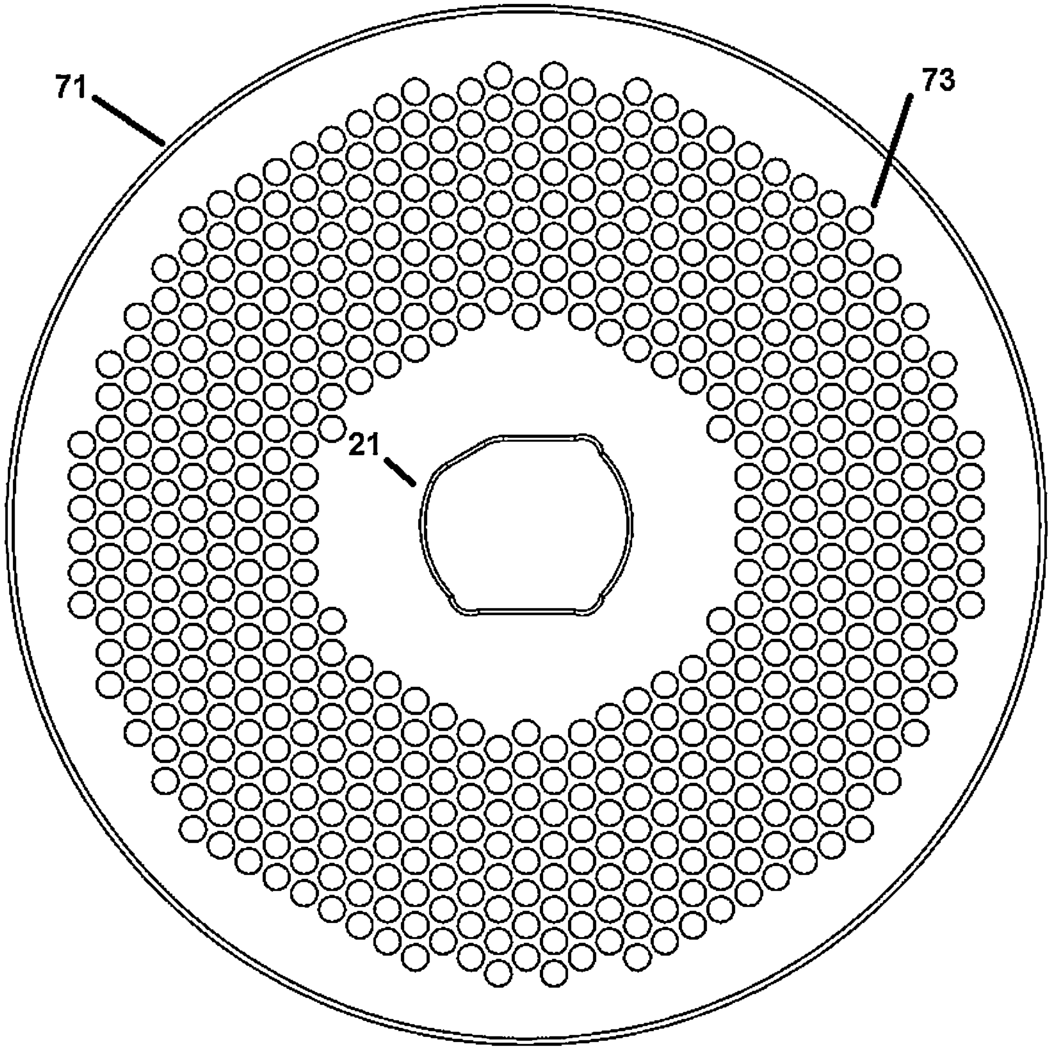
FIG. 7: a perforated disc.

FIG. 7 shows a perforated disc 71 with a hub 21, and with a plurality of holes 73 arranged around the hub 21.

LIST OF REFERENCE SIGNS

- 10, 10'—Knife journal
- 11—Connecting section
- 12—Contact surface
- 13—Storage section
- 14, 14'—Coding element
- 15—Circumferential surface
- 151, 152, 153, 154—Partial circumferential surface
- 20, 20'—Knife
- 21—Hub
- 22—Through-hole
- 23—Inner surface (drive surface)
- 231, 232, 233, 234—Partial inner surface
- 24, 24'—Coding element
- 25—Knife blade
- 26—Cutting edge
- D—Direction of rotation

The invention claimed is:

1. A cutting set system for a meat grinder, comprising a drivable knife journal and cutting set elements mounted on the knife journal, wherein the knife journal has a bearing section for the cutting set elements mounted on the knife journal, wherein a cutting set element has a central hub provided with a through hole for rotationally fixed mounting on the knife journal, the through hole defining an inner surface thereof, the cross section of the knife journal being adapted to the cross section of the through hole of the cutting set element, wherein several partial circumferential surfaces form a circumferential surface of the knife journal, and two of the partial circumferential surfaces are parallel, and wherein the two parallel partial circumferential surfaces act as drive surfaces with suitably designed partial inner surfaces of the inner surface of the through hole of the cutting set element interact during a rotational movement in a direction of rotation, wherein at least one coding element is present in the form of a first at least one coordinated coding feature on the peripheral surface of the knife journal, and wherein a complementary coding element is present in the form of a first at least one complementary coding feature on the inner surface of the through hole of the cutting set element and characterized in that, the first at least one coordinated coding feature of the knife journal is between a partial circumferential surface and an adjacent parallel partial circumferential surface and the first at least one complementary coding feature of the cutting set element is between a partial circumferential surface and an adjacent parallel partial circumferential surface.

2. The cutting set system according to claim 1, characterized in that the cutting set element is a perforated disk with a plurality of holes arranged around the hub, or is a knife with a plurality of knife blades arranged around its hub, extending outwards from the latter, with at least one cutting edge.

3. The cutting set system according to claim 1, characterized in that the first at least one coordinated coding feature is shaped to fit the first at least one complementary coding feature.

4. The cutting set system according to claim 1, wherein the knife journal has an axial direction, characterized in that the first at least one coordinated coding feature of the knife journal represents a connecting surface running in the axial direction of the knife journal (10, 10') of adjacent partial circumferential surfaces of the knife journal, the first at least one coordinated coding feature of the knife journal defined by absence of material from the contact edge of these two adjacent partial peripheral surfaces.

5. The cutting set system according to claim 4, characterized in that the first at least one coordinated coding feature has a flat connecting surface between adjacent partial circumferential surfaces running in the axial direction of the knife journal, and the first at least one complementary coding feature on the cutting set element has a corresponding flat connecting surface between adjacent partial inner surfaces.

6. The cutting set system according to claim 4, characterized in that the first at least one coordinated coding feature has a curved connecting surface running in the axial direction of the knife journal between adjacent partial circumferential surfaces, and the first at least one complementary coding feature on the cutting set element has a corresponding curved connecting surface between the partial inner surfaces.

7. The cutting set system according to claim 1, characterized in that the first at least one coordinated coding feature comprises a rib running in the axial direction of the knife journal, and the first at least one complementary coding feature on the cutting set element comprises a groove running in the axial direction.

8. The cutting set system according to claim 1, characterized in that a transponder is also present on the inner surface of the through hole of the cutting set element, which cooperates with a receiver which is arranged in the knife journal.

9. The cutting set system according to claim 1, characterized in that the knife journal has a front connecting section for connecting to a screw conveyor of the meat grinder.

* * * * *